July 29, 1958 D. E. FOLEY 2,845,478

SELECTIVE STATION CALLING SYSTEM

Filed Feb. 12, 1954

INVENTOR
D. E. FOLEY
BY R.C. Terry
ATTORNEY 2,845,478

SELECTIVE STATION CALLING SYSTEM

Daniel Elmore Foley, Belleville, N. J., assignor to American Telephone and Telegraph Company, a corporation of New York Application February 12, 1954, Serial No. 409,866

7 Claims. (Cl. 178—4.1)

This invention relates to communication systems and more particularly to teletypewriter systems wherein a plurality of stations on a common line circuit may set up connections between each other and exclusively appropriate the line circuit to their own use whereby any one of the stations may be connected to one or more of the other stations.

An object of the invention is to select stations for a communication connection by means of a simple selector arrangement at each station that is operable in response to two teletypewriter character code signals whereby the first signal prepares one or more selections and the second signal completes the desired one of the prepared selections.

Another object is to increase the number of individually selectable stations on a common line circuit by assigning two selection code signals to each station.

Another object is to reduce the time for selecting one or more of the other stations and to permit a large number of stations to be selected for connection to the connecting line circuit.

A feature of the invention is the provision of means of activating by means of a "break" signal of at least one-second duration the teletypewriter motors, at all stations connected to the line circuit.

Another feature is the provision of means of establishing an effective connection for communication purposes to a teletypewriter at one or more stations on the line circuit so that any station may call any other station or stations on the same line circuit by typing their assigned call letters on the teletypewriter after first transmitting the one-second "break" signal.

Another feature is the provision of means for automatically disconnecting, at the conclusion of the transmission of the call directing codes to the one or more stations desired in an established connection, the power sources from their respectively associated teletypewriter motors at all stations not wanted in the established connection.

Another feature resides in the use of the two letter signals constituting the call directing code, the signals being assigned indiscriminately and the same two letters may be used in reverse order if desired.

Another feature is the provision of two cold cathode tubes respectively operative at the beginning and the ending of a "break" signal for effecting the starting of the teletypewriter motors at all the stations for operation on a temporary basis and a third cold cathode tube for establishing in response to the second teletypewriter character signal of a two-letter call directing code a supplementary connection of the power source to the teletypewriter motor at a wanted station, which serves to maintain the motor operating for the duration of a call, that is, on a permanent basis.

Another feature is the use of condensers for operating the cold cathode tubes, particularly in connection with the above-mentioned third cold cathode tube where the condenser is arranged to charge in a circuit completed by a set of pull-bar contacts in each of the teletypewriters at certain stations in response to a correctly received first teletypewriter character signal of a call directing code and discharge in a circuit completed by another or the same set of pull-bar contacts in the teletypewriter at the desired one of such certain stations in response to the correctly received second character signal of the call directing code.

According to the present invention the station selector circuit is designed primarily for use with the tape-type teletypewriter; however, the page, or bulletin, type teletypewriter might be also used if a platen shift contact were provided for this type of machine. A calling station, which may be any one of the stations connected to a line circuit, initiates a call by the manual operation of a call-answer key whereby the power supply at the calling station is connected to its local teletypewriter motor on a permanent basis. The stations are selected for the reception of a message by successively transmitting a "break" signal, a "figures" signal, two letter signals assigned to each of the desired stations and the "end-of-address" signal which consists of a "carriage return signal," a line feed signal and a "letters" signal. The "break" signal, which should be of at least one-second duration, causes the power supply at each station to be connected to its associated teletypewriter motor. The "figures," or shift, signal operates the platen of the teletypewriter at each station to its shift, or upper case, position. The two-letter call directing, or address, codes are respectively assigned to the stations connected to the line circuit and operate circuits for selecting the desired stations. The first signal of a two-letter call directing code prepares the circuit at one or more stations to which the letter signal is assigned, to maintain the power connections if the correct second signal of the code is received by the teletypewriter. If the second letter received by the teletypewriter is not the correct one, the circuit or circuits function to maintain their power supplies connected to their respective teletypewriter motors only on a temporary basis. When the second letter is the correct one the corresponding pull-bar contact set closes to cause the power supply connection to the teletypewriter motor at that receiving station to be maintained and to cause audible and/or visible signals to be operated at such receiving station. The "letters" of the "end-of-address" signal operates the platen of the teletypewriter at each station to its unshift, or lower case, position whereby the teletypewriters at the desired station or stations remain in operation to receive the message and the motors at the undesired stations are shut down. The attendant at each called station operates the call-answer key to disable the audible or visible signal and to render the shutting down of the motor subject to manual control. At the conclusion of the call the power supply at the receiving station is disconnected by restoring the call-answer key at the receiving station to its "off" position.

The tape-type teletypewriter is preferably that disclosed in Morton-Krum Patent 1,745,633, issued February 4, 1930, and the page, or bulletin, type teletypewriter is preferably that disclosed in Morton-Krum-Kleinschmidt Patent 1,904,164, issued April 18, 1933, the disclosures of which are hereby made parts of the present specification as if fully included herein.

A specific illustration of the present invention is shown herein as applied to a teletypewriter switching system wherein a communication line circuit is provided to serve a plurality of stations, each equipped with a teletypewriter. Each station is also provided with (1) a source of power supply; (2) a call-answer key for controlling the circuits and the equipment of a station as a calling station and as a called station; (3) a "break" key for sending a "break" signal for starting the operation of the motors of all the teletypewriters connected to the line circuit; (4) two timing circuits responsive to the opening and closing, respectively, of the line circuit in transmitting the "break" signal; (5) a cold cathode tube preferably of the 313C type as disclosed in T. E. Foulke Patent 1,965,589, granted July 10, 1934, in each timing circuit, one arranged to start conducting about 500 milliseconds after the line circuit opens in response to the "break" signal to start the teletypewriter motors operating and the other arranged to start conducting about 250 milliseconds after the line circuit closes to condition the station equipment to receive the "figures" and the two-letter directing, or address code, signals; (6) a third timing circuit and a third cold cathode tube responsive thereto; (7) a "figures" pull-bar contact set responsive to the "figures" signal to operate the teletypewriter platen to its "shift," or upper case, position; (8) a first letter pull-bar contact set responsive to the first letter signal of the call directing code for charging a condenser in the third timing circuit; (9) a second letter pull-bar contact set responsive to the second letter signal providing the signal is the one which is assigned to such contact set, for discharging the condenser to cause the third cold cathode tube to conduct and thereby close a holding circuit for maintaining operated the teletypewriter motor especially after the first-mentioned motor control circuit is opened; and (10) a platen control contact set which in response to the "letters" signal following the call directing signals, is closed to complete a circuit from ground at the universal contact set to thereby disable the first-mentioned cold cathode tube which when disabled, opens the first-mentioned motor control circuit. The pull-bar contact sets are of the type disclosed in Beattie-Cunningham-Roycroft Patent 2,120,235, issued June 14, 1938. The motor at the calling station remains operating through the operated contacts of key 20 and at the called station or stations the motors remain operating through the conduction of the third cold cathode tube or the operated contacts of the keys at such stations. At the unwanted stations the power for the teletypewriter motors is disconnected at the expiration of the call directing code when the platen contact is closed in response to the "letters" signal. The universal contact upon closing, discharges the condenser in the third timing circuit if the second letter signal of a call directing code is not correct, that is, does not correspond to the letter assigned to the station at which the contact set in response to the first letter signal, is operated.

The functional teletypewriter signals used herein are composed of the following selecting pulse combinations: "figures"—mark, mark, space, mark and mark; "letters"—mark, mark, mark, mark and mark; "carriage return"—space, space, space, mark and space; and "line feed"—space, mark, space, space and space.

A more complete understanding of the invention will be had from the following description taken in conjunction with the accompanying drawing wherein.

Figures 1, 2:
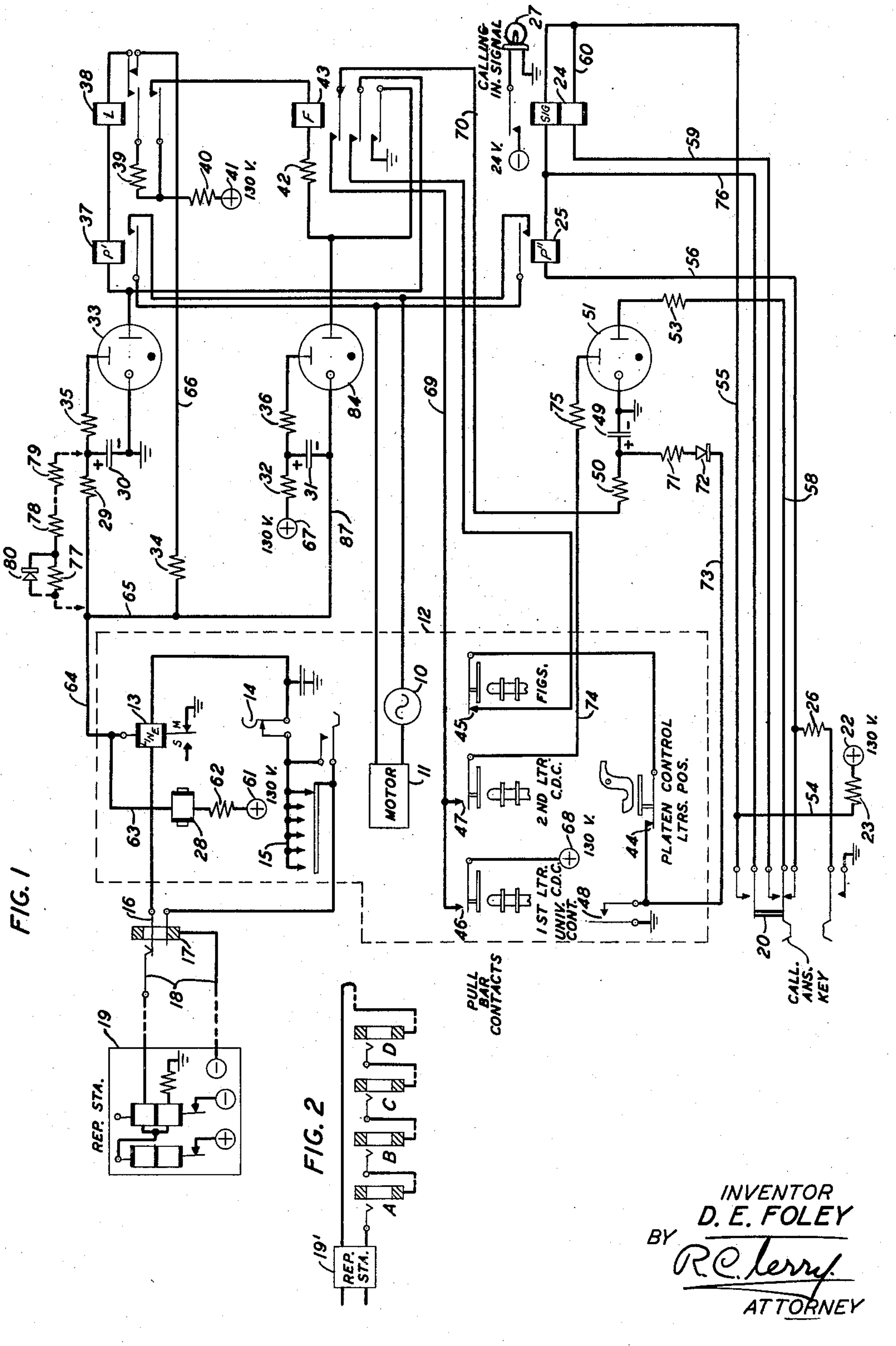
Fig. 1 shows one station in detail.
Fig. 2 represents four similar stations in diagrammatic form, connected in series to a repeater station.

Fig. 1 shows source 10 of alternating current arranged to be connected to motor 11 of teletypewriter 12. Teletypewriter 12 comprises line relay 13, "break" key 14 and transmitting contacts 15 all of which are connected in series in a path extending through plug 16 and jack 17 to line circuit 18. Line circuit 18 may be extended through several stations represented in Fig. 2 by jacks, A, B, C and D to line repeater 19'.

Call-answer key 20 at station A, shown in Fig. 1, is shown in its normal position and when station A is calling, it is used to initiate the call by being operated to its alternate position. When key 20 at a calling station is operated, it closes a circuit extending from source 22 of positive potential, say of 130 volts, through resistor 23, conductor 54, normally open uppermost contact (now closed) of key 20, conductor 76, through the winding of power relay 25, conductor 56, resistor 26, to ground at the normally open lowermost contact (now closed) of key 20, and relay 25 operates to close at its armature and contact an operating circuit for teletypewriter motor 11 which starts operating. The call-answer key corresponding to key 20, located at a called station and being in its normal position is not operated until after the called station is selected and the incoming message is being received, and then only to extinguish the calling-in lamp at the called station which corresponds to lamp 27 in Fig. 1.

The armature of line relay 13, which may be polarized, is connected to three paths respectively extending to (1) the winding of printer selector magnet 28 of teletypewriter 12, (2) the first timing circuit including resistor 29 and condenser 30, and (3) a second timing circuit including condenser 31 and resistor 32. The upper plates of condensers 30 and 31 are respectively connected in paths extending through resistors 35 and 36 to the control electrodes of cold cathode tubes 33 and 84 and the lower plates are respectively connected in paths extending to the tube cathodes. The anode of tube 33 is connected in a path extending through the windings, in series, of relays 37 and 38, front contact and inner armature of relay 38, when operated, resistors 39 and 40, to grounded source 41 of positive potential, say of 130 volts. The anode of tube 84 is connected in a path extending through resistor 42, winding of relay 43, front contact and outer armature of operated relay 38, resistor 40, to potential source 41.

Also shown as part of teletypewriter 12 are platen control contact set 44 which is closed when the platen is in the unshift, or lower case, position, "figures" pull-bar contact set 45 which is momentarily opened when the platen is operated to its shift position, pull-bar contact sets 46 and 47 which are respectively arranged to close in response to the first and second signals respectively corresponding to the two letters of the address, or call directing code for the station shown in Fig. 1, and universal contact set 48 which is momentarily closed during each receiving cycle of teletypewriter 12. The closing of contact set 48 connects an effective ground to a circuit for disabling tube 33 in response to the "letters" signal of the "end-of-address" signal at a time when the platen control contact set 44 has closed and the "figures" contact set 45 is in the normal closed condition. The circuit thus closed extends over the middle armature and front contact of relay 43, then in parallel paths one extending to the anode of tube 33 and the other, through the windings, in series, of relays 37 and 38, front contact and armature of relay 38, resistors 39 and 40 to source 41 of positive potential.

There is also provided a third timing circuit comprising condenser 49 and resistor 50. Condenser 49 is arranged to charge to a positive potential when the first signal pull-bar contact set 46 is closed in response to the first letter signal of the address code for the station and is discharged when the signal pull-bar contact set 47 is closed in response to the correct second letter signal of the address code, the discharge being across the control electrode and cathode of tube 51 and effective to cause the tube to fire.

Tube 51 upon firing, is caused to conduct current in a circuit traceable from source 22 of positive potential, through resistor 23, the upper winding of call-in signal relay 24, winding of power relay 25, conductor 56, normally closed contact of the call-answer key 20 which at the called station, is in its normal position, conductor 58, resistor 53, anode-cathode of tube 51, to ground. Relays 25 and 24 at the called station operate. Relay 25, upon operating, closes at its armature and contact a holding circuit for teletypewriter motor 11 at the wanted station, and the motor remains operating after power relay 37 releases. Relay 24, upon operating, closes at its upper armature and contact a circuit for lighting calling-in signal lamp 27.

After the last address code signal is transmitted, "carriage return," "line feed" and "letters" signals of the "end-of-address" signal are successively transmitted and the "letters" signal is effective to move the teletypewriter platen to its unshift, or lower case position. Platen control contact set 44 closes and the simultaneous closing of universal contact set 48 due to the depressing of the "letters" key in response to the incoming "letters" signal, completes the circuit for disabling tube 33 to effect (1) the release of relays 37 and 38, and (2) the release of relay 43.

Following the end-of-address signal the attendant at the calling station begins typing the message. The attendant at the wanted station upon observing the lighting of calling-in signal lamp 27, operates call-answer key 20 at his station to extinguish lamp 27 and to close a holding circuit for relay 25 which is thereby held operated for the duration of the call or until key 20 is restored to its normal position.

At the unwanted stations the power supplies will be disconnected from their respective teletypewriter motors when the platen control contact sets 44 close in response to the "letters" signal of the end-of-address signal. Likewise if the motors of idle teletypewriters are falsely started, because of an open circuit or a long "break" signal transmitted while the line circuit is in operation, the power supplies for such teletypewriters will be disconnected following the first character signal received with the teletypewriter platens in their lower case positions. Such false starts, however, will not operate the calling-in signal lamps.

*Detailed description*

The schematic circuit shown in the drawing will represent herein both a calling and a called station for the purpose of describing the detailed operation of the system, since the equipments at all stations are identical in form. However, there is a slight difference in the operation in that a distinctive address code combination of two letter signals is assigned to each pair of letter pull-bar contact sets 46 and 47 as the calling identification of the station. The first letter pull-bar contact set 46 may have assigned to it a letter that is also assigned to the first or second letter pull-bar contact set at one or more of the other stations, avoiding the use of the same letter twice in an address code combination.

Relay 13 at each station follows the signals transmitted from teletypewriter transmitting contacts 15 at any station. The signals repeated by relay 13 at each station operate printer selector magnet 28 at its associated station. Printer selector magnet 28 causes the repeated character signals to be recorded on its associated teletypewriter 12. Should the teletypewriter be in a "shift" position as in response to a "figures" signal, the first and second letter signals of the address codes of the stations wanted in the connection, in addition to being recorded, would also serve to fulfill certain predetermined functions such as switching and selecting. The "letters" signal of the "end-of-address" signal serves to move the teletypewriter platen into its "unshift" position in preparation for receiving the message.

Assuming that a call is originating at station A shown in Fig. 1, call-answer key 20 thereat is manually operated to cause source 10 of alternating current to be connected to motor 11 at the armature and contact of relay 25 and the teletypewriter motor at calling station A starts operating. The operating circuit for relay 25 is traceable from grounded source 22 of positive potential, resistor 23, conductor 54 uppermost normally open contact (now closed) of key 20, conductor 76, the winding of relay 25, conductor 56, resistor 26, to ground at the lowermost normally open contact (now closed) of key 20.

Immediately following the operation of key 20, "break" key 14 is operated to transmit a "break" signal of at least one-second duration to connect at each station source 10 of alternating current to motor 11 and the teletypewriter motors at all the other stations connected to line circuit 18 start operating. The "break" signal upon being transmitted operates at each station line relay 13 to its "space," or left-hand, contact, and the armature of relay 13 upon moving off its marking, or right-hand, contact, causes condenser 30 in the first timing circuit to charge to a positive potential from source 61 in an obvious circuit. After about 500 milliseconds, condenser 30 accumulates a charge of sufficient potential to cause cold cathode tube 33 to fire and thereby cause a current to flow in a circuit traceable from source 61, resistor 62, the winding of selector magnet 28, conductors 63, 64 and 65, resistor 34, conductor 66, make-before-break contacts of relay 38, the windings, in series, of relays 38 and 37, anode-cathode discharge path of tube 33, to ground, and relays 37 and 38 operate. Relay 37, upon operating, closes at its armature and front contact an obvious circuit for connecting alternating-current potential source 10 to teletypewriter motor 11 so that the teletypewriter motors at all the stations start operating simultaneously on a temporary basis. However, the motor at the calling station has already been started on a permanent basis in response to the manual operation of call-answer key 20 at that station. Relay 38, upon operating, (1) closes at its inner armature and front contact an obvious holding circuit for maintaining relays 37 and 38 operated and tube 33 conducting; and (2) prepares at its outer armature and front contact a circuit extending from battery 41 through resistor 40, outer armature and front contact of relay 38, winding of relay 43, resistor 42, anode-cathode of cold cathode discharge path tube 84, conductors 87, 65 and 64, armature and "mark" contact of line relay 13, to ground. The circuit just described will close shortly after the expiration of the "break" signal.

At the expiration of the "break" signal, line relay 13 again becomes energized to move its armature into engagement with its "mark" contact and a circuit is thereby closed from grounded positive potential source 67, resistor 32, condenser 31 of the second timing circuit, conductors 87, 65 and 64, armature and "mark" contact of relay 13, to ground. After about 250 milliseconds, condenser 31 accumulates a charge of sufficient positive potential to cause tube 84 to fire whereby current is caused to flow through the winding of relay 43 and anode-cathode of tube 84 in the prepared circuit hereinbefore traced. Relay 43 operates and (1) locks operated to ground at its outer armature and front contact, this ground also serving to disable tube 84; (2) prepares at its middle armature and front contact a circuit for disabling tube 33 when normally open universal contact set 48 closes momentarily at a time when contacts 44 and 45 are closed in response to the "end-of-address" signal which restores the teletypewriter platen to its "unshift" position, and (3) connects at its innermost armature and front contact the left-hand plate of condenser 49 in the third timing circuit to a contact member of each of the normally open first and second letter contact sets 46 and 47.

When the "break" key is released to a closed position, the attendant at the calling station momentarily depresses the "figures" key of the teletypewriter keyboard to transmit a "figures" signal. At each of the stations line relay 13 responds to the signal to cause its selector magnet 28 to operate the "figures" pull-bar whereby its contact set 45 is momentarily opened to open a circuit hereinbefore described as being prepared at the middle armature and front contact of relay 43. The "figures" pull-bar, upon being operated, also moves its teletypewriter platen to its "shift" position whereby platen control contact set 44 is opened until the end-of-address code signal is transmitted from the keyboard of the teletypewriter at the calling station. The momentary closure of the universal contact set 48 incident to response of the teletypewriter to the "figures" signal has no effect at this time because of the open condition of contact set 44 in the circuit prepared at the middle armature and front contact of relay 43.

Following the operation of the "figures" key the attendant at the calling station next depresses the key corresponding to the first letter of the call directing, or address, code of the station to be selected. The first letter signal causes the corresponding pull-bars at the teletypewriters at all stations to be operated and the first letter is recorded in upper case at all the teletypewriters. However, the teletypewriter pull-bars corresponding to the first letter of the code at certain stations only are equipped with contact sets corresponding to contact set 46 and these contact sets, which are at those stations to which the letter is assigned as constituting a part of the address code, are also operated in response to the first letter signal. Contact sets operable by the pull-bars operated at those teletypewriters to which the first letter signal is assigned, operate in response to the first letter signal and thereby close at each of their stations a circuit traceable from grounded source 68 of positive potential, say of 130 volts, normally open contact set 46 (now closed), conductor 69, front contact and innermost armature of relay 43, conductor 70, resistor 50, condenser 49 of the third timing circuit, to ground. Condenser 49 is bridged by a path extending over resistor 71, varistor-rectifier 72 and conductor 73, to ground at universal contact set 48. The duration of the closure of the universal contact set is approximately 40 milliseconds of the 70-millisecond duration of the closure of the pull-bar contact set 46. Resistors 71 and 50 are so proportioned that the condenser will accumulate a charge sufficient to cause cold cathode tube 51 to fire in response to closure of contacts 47, with a considerable variation in the closure periods of contacts 46 and 48.

Following the operation of the key corresponding to the first letter of the address code, the key corresponding to the second letter of the address code is depressed at the calling teletypewriter. The second letter signal causes the corresponding pull-bars of the teletypewriters at all stations to be operated and the second letter is recorded, also in upper case. The teletypewriter pull-bars corresponding to the second letter of the code at certain stations only are equipped with contact sets corresponding to contact set 47 and these contact sets, which are at those stations to which the letter is assigned as constituting a part of the address code, are operated in response to the second letter ineffectively at all stations but one. At this excepted one station the closure of contact set 47 finds a stored positive potential on condenser 49 and closes a circuit from ground, condenser 49, resistor 50, conductor 70, innermost armature and front contact of relay 43, conductor 69, contact set 47, conductor 74, resistor 75, control electrode-cathode of tube 51, to ground. The charge stored on condenser 49 is of sufficient potential to cause tube 51 to fire and thereby cause a current to flow in a circuit traceable from grounded source 22 of positive potential, through resistor 23, conductors 54 and 55, upper winding of relay 24, winding of relay 25, conductor 56, normally closed contact of key 20 at the called, or wanted, station, conductor 58, resistor 53, anode-cathode discharge path of tube 51, to ground. Relays 24 and 25 operate. Relay 24, upon operating, closes at its upper armature and front contact an obvious circuit for calling-in lamp 27 which lights to indicate to the attendant at the wanted station that a call for his station is awaiting. Power relay 25, upon operating, closes at its armature and front contact an obvious holding circuit in parallel with the circuit closed by the operation of power relay 37, for maintaining the teletypewriter motor at the wanted station operated after power relay 37 releases as hereinafter described.

As hereinbefore stated, at the end of the address code an "end-of-address" signal comprising the "carriage return," "line feed" and "letters" signals, is transmitted by depressing the corresponding keys of the teletypewriter keyboard at the calling station. In response to the "letters" signal the platen returns to its unshift, or lower case, position wherein the message will then be recorded on the teletypewriter at the wanted station. With the "figures" pull-bar contact set 45 in the normal condition as shown and platen control set 44 closed, the momentary closure of universal contact set 48, incident to response of the teletypewriter to the "letters" signal, will cause ground to be connected at each station to the circuit which has been hereinbefore traced over the middle armature and front contact of relay 43 to the left-hand end of the winding of relay 37, thereby shunting the anode of tube 33 which now becomes disabled. When universal contact set 48 opens after a closed interval of about 40 milliseconds, relays 37 and 38 release. Power relay 37 upon releasing, opens the operating circuit of teletypewriter motor 11 at each station except at the wanted station and the motors at all stations except that at the wanted station cease to operate. The motor 11 at the wanted station continues to operate in the circuit closed at the armature and front contact of power relay 25 which is still held operated by the conduction of tube 51. Relay 38, upon releasing, opens at its outer armature and front contact the circuits for maintaining relay 43 operated and relay 43 releases.

Following the "carriage return," "line feed" and "letters" as an end-of-address code signal, the attendant at the calling station types the message.

When the attendant at the wanted station observes the lighting of calling-in signal lamp 27, he answers by operating his call-answer key 20. Key 20 at the wanted station, upon being operated (1) closes a circuit extending from grounded source 22 of positive potential, resistor 23, conductor 54, uppermost normally open contact (now closed) of key 20, conductor 76, winding of power relay 25, conductor 56, resistor 26, to ground at the lowermost normally open contact (now closed) of key 20; (2) shunts at its contacts the winding of relay 24 which releases to thereby extinguish the calling-in signal lamp 27; and (3) opens at its normally closed contact the conducting circuit for tube 51 which now ceases to conduct. Power relay 25 remains operated under the influence of the current in the circuit closed through the operated contacts of key 20 and remains operated for the duration of the call. After the complete message is received the attendant at the wanted station restores key 20 to its normal position whereby power relay 25 releases to stop motor 11.

At the unwanted stations where the address code pull-bar contact sets are not responsive to the incoming address codes the teletypewriter motor control power sources 10 will be disconnected when the teletypewriter platen control contact sets 44 close in response to the "letters" signal of the end-of-address signal. Likewise, if idle teletypewriter motors are started falsely because of an open line circuit or by a long "break" signal transmitted while the line is in operation, such teltypewriter motors will stop operating immediately following the first character signal that is received in lower case, that is, when the associated teletypewriter platens are in their "unshift" positions. Furthermore, these false starts will not operate the calling-in signal lamps.

Universal contact set 48 discharges condenser 49 at the unwanted stations, at which the second letter of the address code is not the code letter assigned to those stations. This feature prevents false operation of the calling-in signals when the same letter is used for more than one station. The two letters constituting the address code can be assigned indiscriminately and the two letters can be used in reversed order if desired.

When more than one address code is transmitted it is necessary to precede each address code with a "figures"

signal if each address code is followed by a "space" signal, as it should be to separate the address codes as recorded on the teletypewriters, and the teletypewriters are arranged to unshift automatically to the "letters" condition in response to the "space" signal, which is a well-known arrangement. The repetition of the "figures" signal is necessary in order to place the teletypewriters to which the first letter of each address code is assigned, in an upper case printing position in which contacts 44 are open.

In the event that an automatic tape transmitter is used instead of a keyboard, the first timing circuit which controls the operation of tube 33 may require modification as shown by the substituted path including resistors 77, 78 and 79 and varistor-rectifier 80 connected in shunt to resistor 77. This substituted path would prevent tube 33 from firing when miscellaneous signals are transmitted at a fast rate of speed as is done when an automatic transmitter-distributor is used. This condition could be corrected by replacing resistor 29 with two or more resistors 77, 78, 79 etc. so that a portion of such resistors could be shunted by varistor-rectifier 80 in order to reduce the resistance of the condenser discharge circuit below the resistance of resistor 29 of the charge circuit. The actual resistance values required in this modification would depend somewhat on the backward and forward resistance values of the varistor-rectifier used.

*Recall feature*

The anode-cathode circuit of tube 51 including a winding of relay 24 is connected through both the normal and operated contacts of key 20 so that the reception of the call directing code will operate calling-in signal lamp 27 regardless of whether or not key 20 is operated. This feature speeds up the service by eliminating the "don't answer" condition if key 20 is left inadvertently in an operated position. When key 20 is inadvertently left in an operated position it maintains closed a circuit traceable from grounded source 22 of positive potential, resistor 23, conductor 54 uppermost normally open (now closed) contact of key 20, conductor 76, through the winding of power relay 25, conductor 56, resistor 26, lowermost normally open (now closed) contact of key 20, to ground and relay 25 remains operated while key 20 is in an operated position. When a call directing code is received for the station at a time when key 20 thereat is in an operated position a circuit is closed when tube 51 fires, that is traceable from grounded source 22 of positive potential, resistor 23, conductors 54, 55 and 60, through the lower winding of relay 24, conductor 59, middle normally open (now closed) contact of key 20, conductor 58, resistor 53, anode-cathode of tube 51, to ground. Relay 24 operates to light calling-in signal lamp 27. When signal lamp 27 lights at a time when key 20 is in an operated position the lamp can be extinguished by momentarily restoring key 20 to its normal position.

What is claimed is:

1. In a teletypewriter system, a communication channel, a plurality of normally deactivated teletypewriter stations associated with said channel, means responsive to a signal impressed upon said channel for activating all of said stations, electrical storage means at said stations selectively responsive to address signals impressed upon said channel for storing an electrical condition at certain, but not all, of said stations, means at said stations selectively responsive to the next transmitted address signal for causing said stored condition to effect the selection of the station to receive a message, means for deleting the stored electrical condition at stations not selected by the last-mentioned address signal, and signal responsive means for deactivating unselected stations to leave only the selected ones activated.

2. In a teletypewriter system, a communication channel, a plurality of stations associated with said channel, a normally deactivated teletypewriter at each of said stations, a station selecting circuit, means responsive to the beginning of an impulse impressed upon said channel for activating all of said stations, other means responsive to the end of said impulse for preparing said selecting circuit to receive calling code signals, signal operated electrical storage means at said stations selectively responsive to address signals impressed on said channel for storing at certain, but not all, of said stations an electrical charge in said selecting circuit, other signal responsive means at said stations selectively responsive to another address signal impressed on said channel for utilizing the stored charge to select a desired one of said certain stations to receive a message, and still other means responsive to still another signal impressed on said channel for deactivating the teletypewriters at the unselected stations, said last-mentioned means comprising a path for deleting said stored charge in said selecting circuit at stations not selected by the last-mentioned address signal.

3. In a teletypewriter system, a communication channel, a plurality of stations associated with said channel, a normally deactivated teletypewriter and motor therefor at each of said stations, a source of power at each station for operating its associated teletypewriter motor, means at each station for impressing signals on said channel, space discharge means responsive to a signal for activating the teletypewriters at all stations, means at said stations selectively responsive to received teletypewriter signals for storing an electrical charge, means at said stations selectively responsive to another received teletypewriter signal impressed on said channel for utilizing said stored charge to select a desired one of said stations to receive the message, and mechanically operated means at said stations responsive to still another received teletypewriter signal for disconnecting the power sources from their respectively associated teletypewriter motors at all stations not wanted in a desired connection.

4. In a teletypewriter system, a communication channel, a plurality of stations associated with said channel, a normally deactivated teletypewriter and motor therefor at each of said stations, a source of power at each of said stations for operating its associated teletypewriter motor, timing circuits each comprising a condenser and a space discharge device at each of said stations, respectively responsive to the beginning and the ending of an impulse impressed on said channel for long duration in comparison with any code combination of impulses for effecting the connection of the power source to its associated teletypewriter motor at each of said stations so that the teletypewriter motors at all stations start simultaneously on a temporary basis, another timing circuit comprising a condenser and a space discharge device, means at each of said stations selectively responsive to teletypewriter signals respectively assigned to the stations and impressed on said channel for storing on the condenser in said other timing circuit an electrical charge, other means at said stations selectively responsive to the next succeeding assigned teletypewriter signal impressed on said channel for causing said stored charge to operate said space discharge device in said other timing circuit to effect the connection of the power source to its associated teletypewriter on a permanent basis at a desired one of said stations, and still other means at each of said stations responsive to another teletypewriter signal impressed on said channel for disconnecting the power sources from their respectively associated teletypewriter motors at all stations not wanted in a desired connection.

5. In a telegraph system, a normally closed line circuit, a plurality of stations connected to said line circuit, each station comprising a printing teletypewriter set, a source of permutation code signals in said teletypewriter, a normally disabled motor for said teletypewriter, means for initiating a call to one or more of the other of said stations and for operating on a permanent basis its associated motor, means responsive to a prolonged open condition of said line circuit for operating and maintaining operated on a temporary basis its associated motor, an operable device and locking means therefor, means responsive to the reclosure of said line circuit for operating said device in a locked operated condition, means responsive to a permutation code signal impressed upon said line circuit for operating its associated teletypewriter to its upper case printing position, means at certain of said stations responsive to a second permutation code signal for conditioning the motors at said certain stations for operation on a permanent basis, means responsive to a third permutation code signal impresed upon said line circuit for operating on a permanent basis the motor at one only of said certain stations, and means responsive to another permutation code signal impressed upon said line circuit for restoring said teletypewriter at all stations to their respective lower case printing positions and for stopping the motors at all stations but said one of said certain stations.

6. In a teletypewriter system, a normally closed line circuit, a plurality of stations connected to said line circuit, each station comprising a teletypewriter, a source of permutation code signals in said teletypewriter, a normally disabled motor for each teletypewriter, manually operable means for initiating a call to one or more of the other of said stations and for operating on a permanent basis their respectively associated motors, a timing circuit responsive to an open condition of said line circuit for at least a predetermined interval for operating and maintaining operated on a temporaory basis its associated motor, a circuit for selecting said motor for operation on a permanent basis, a second timing circuit jointly responsive to the operation of said first-mentioned timing circuit and the reclosure of said line circuit, an operable device and locking means therefor responsive to the operation of said second timing circuit for deenergizing said first-mentioned timing circuit and for preparing for operation said motor selecting circuit, a third timing circuit, a contact set operable in response to a permutation code signal impresed upon said line circuit, at any of said stations for conditioning said teletypewriters to record the call signals of a station desired in a connection, a second contact set at certain, but not all, of said stations responsive to a second permutation code signal impressed upon said line circuit from the source at said calling station for conditioning said third timing circuit for operation, a third contact set at one only of said certain stations responsive to a third permutation code signal impressed upon said line circuit for operating said third timing circuit to select said motor for operation on a permanent basis, and means in said teletypewriter responsive to another permutation code signal impressed upon said line circuit for deenergizing said means for operating said motor on a temporary basis and restoring to normal said operable device.

7. In a selective station calling system, a plurality of signal responsive telegraph stations, a signal responsive selector mechanism at each of said stations including individually selectable elements, a capacitor and an electron discharge trigger device at each station, circuit control means operable by one of the selectable elements at each of said stations according to a first assigned address code signal for causing to be impressed upon said capacitor a charge of sufficient magnitude to activate said trigger device, circuit control means operable by another of the selectable elements according to a second assigned address code signal for causing the charge on said capacitor to activate said trigger device, and means operable by said trigger device for rendering the station effectively responsive to telegraph message signals thereafter received.

References Cited in the file of this patent

UNITED STATES PATENTS

| | | |
|---|---|---|
| 1,845,993 | Wise | Feb. 16, 1932 |
| 2,148,430 | Benjamin | Feb. 28, 1939 |
| 2,148,435 | Carr | Feb. 28, 1939 |
| 2,152,010 | Zenner | Mar. 28, 1939 |
| 2,320,997 | Bacon | June 8, 1943 |
| 2,332,645 | Keithley et al. | Oct. 26, 1943 |
| 2,455,724 | Bacon | Dec. 7, 1948 |
| 2,468,574 | Russnak | Apr. 26, 1949 |
| 2,739,180 | Britt | Mar. 20, 1956 |
| 2,766,318 | Bacon | Oct. 9, 1956 |